Dec. 15, 1942.  P. K. FROLICH ET AL  2,305,412
HEAT AND SULPHUR RESISTANT TIRE CURING BAG
Filed Nov. 24, 1939

Per K. Frolich
Harris D. Hineline  Inventors
By ......... Attorney

Patented Dec. 15, 1942

2,305,412

UNITED STATES PATENT OFFICE 2,305,412

HEAT AND SULPHUR RESISTANT TIRE CURING BAG

Per K. Frolich, Westfield, N. J., and Harris D. Hineline, Mount Vernon, N. Y., assignors, by mesne assignments, to Jasco, Incorporated, a corporation of Louisiana Application November 24, 1939, Serial No. 305,822

8 Claims. (Cl. 18—45)

This invention relates to the manufacture of tires, and relates particularly to a new and useful tire air bag for the vulcanizing of rubber tires in the mold.

In the manufacture of rubber tire casings it is customary to compound the crude gum rubber with a wide variety of substances, including among others carbon black, zinc oxide, stearic acid, mineral rubber, sulphur and accelerator substances. The cotton fabric which is to form the foundation for the tire casing, that is, the carcass, is prepared by treating the cotton fabric with suitably compounded rubber to fill the interstices between the fibres, or to impregnate the fabric with a suitable rubber compound or mix. The fabric is then formed in layers to the desired contours of the tire, and a layer of "compounded" tread stock rubber is applied to the outer surface to prepare the casing for vulcanizing. The vulcanizing is conducted in a steel mold, the inner surface of which has the desired tread contours in intaglio, or in reverse of the desired tread configuration. In order to force the tread fully into the interstices of the mold, it is customary to use a rubber air bag, which is inserted within the casing, the casing and air bag inserted into the mold, the mold closed, the air bag inflated with air to a substantial pressure, and the mold and contained unvulcanized tire carcass and tread are then heated either with live steam, or by electric heat to the desired vulcanizing temperature, which usually is in the neighborhood of 140° C. to 145° C., for the appropriate time to cause the desired vulcanization.

Great difficulty is encountered, however, with such air bags. The extent of vulcanization in a given rubber compound is a function of the amount of sulphur present, and if the amount of sulphur in the rubber exceeds about 5%, the rubber tends to lose its elasticity and if the sulphur content exceeds about 25%, it loses its elasticity entirely and becomes stiff, hard, and brittle. In the curing of rubber tires, the sulphur in the tire casing migrates into the air bag, and accordingly if the air bag is made of rubber, as has previously been necessary, the migrating sulphur, even in small amounts causes the rubber to over-vulcanize rapidly to the point where within a comparatively short time the rubber in the air bag is over-cured and in time is converted into so-called hard rubber, and the elasticity is entirely lost. When this stage is reached, the air bag is no longer capable of forcing the tread stock on the carcass into the contours of the mold, and, in consequence, defective tire casings are produced, since the desired design is not impressed upon the tread surface and the carcass does not attain the proper size and contours. Also, when this stage is reached, especially if attempts are made to use a hardened air bag, great difficulty is encountered in inserting it within the carcass, and in removing it from the carcass, both because of the stiffness of the air bag, and because of the tendency to break or tear during the operation. Thus, prolonged heating in the presence of the migrated sulphur from the tire carcass at the vulcanizing temperature causes marked deterioration of the rubber and in consequence only a relatively small number of casings can be cured over a given air bag.

Also, rubber is subject to deterioration from the effect of oxygen, and this deterioration occurs especially rapidly at elevated temperatures. Tire air bags are commonly inflated with air under pressure ranging from 75 pounds to 150 pounds to the square inch during the curing operation, and they are at the vulcanizing temperature which usually is in the neighborhood of 135° C. In consequence, they are subject to severe oxidizing effects, both because of the high temperature and because of the relatively high concentration of oxygen at the surface of the air bag. In consequence, a substantial and very troublesome oxidation occurs within the interior of the air bag, very greatly weakening the rubber and seriously and rapidly reducing the strength and durability.

Similarly, when tires are vulcanized otherwise than in open steam, as in closed steam-heated molds for such purposes as retreading, or in ovens of various types, the air bag is subjected to oxidizing conditions both inside and outside, and the deterioration is even more rapid.

Such air bags of the prior art are usually produced by an extrusion process and they do not ordinarily contain fabric. Instead, they are made very much thicker than many of the ordinary inner tubes, to the extent of one half inch up to an inch of thickness. They are customarily made of a mixture of rubber with a clay filler in about equal parts, together with smaller quantities of various other ingredients. The combination of very thick walls and clay filler retards the curing effect of diffusing sulphur and permits of a number of vulcanizations on a given tire bag before it is overcured to the point where it fails.

The present invention provides a new and useful air bag made up of a new elastic polymer substance produced by the polymerization of an isoolefin such as isobutylene and a conjugated aliphatic diolefin. This polymer is elastic, can be cured with sulphur, is outstandingly resistant to heat, steam, air and chemical substances generally, does not over-cure at vulcanization temperatures even in the presence of excess quantities of sulphur, and is exceedingly tough and durable, thereby permitting the manufacture of a very greatly increased number of tire casings per air bag.

Thus, an object of the invention is to cure a rubber tire over an air bag formed from an interpolymer of mixed olefinic and diolefinic substances. Another object is to extend the life of the tire air bags. Another object is to maintain the softness and flexibility of tire air bags through a prolonged useful life. Other objects and details of the invention will be apparent from the following description when read in connection with the accompanying drawing wherein Fig. 1 is a view in perspective of a tire air bag according to the invention;

Figure 1:
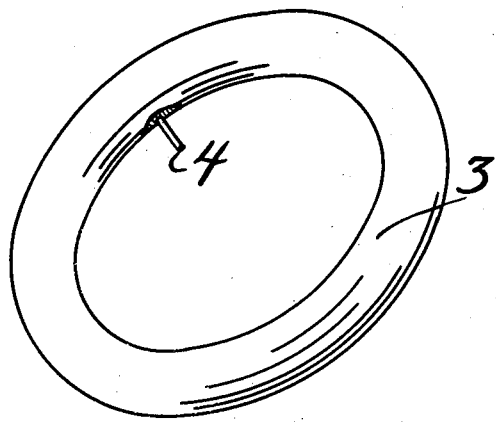

The operation of cracking petroleum to increase the yield of gasoline boiling range hydrocarbons from crude petroleum yields also approximately 15% on the crude oil throughput of fixed gases consisting of hydrogen, methane and its gaseous homologues, ethylene and its gaseous homologues, etc., including a substantial percentage of isobutylene and butadiene. It is found that if isobutylene and a conjugated diolefin such as butadiene, isoprene, pentadiene-1,3, or 2,3-dimethylbutadiene, are mixed in the ratio of from about 70 to 99½ parts of isobutylene to 30 to ½ parts of diolefin, the specific ratio depending upon the diolefin used, and the mixture preferably diluted with a diluent-refrigerant such as ethylene, or propane and solid carbon dioxide; it may be polymerized by the addition thereto of a Friedel-Crafts type catalyst, such as aluminum chloride, dissolved in ethyl or methyl chloride. The resulting polymer may be produced with a molecular weight ranging from 20,000 to 250,000, depending upon the temperature of polymerization, the purity and ratio of the reactants, solvents, etc. This polymer is a substantially saturated substance, having an iodine number lying in the range of 2 to 40 (in contrast to rubber which has an iodine number of 350 to 370, in contrast to the original isobutylene which has an iodine number of 450, and to the butadiene which has an iodine number of 940). The resulting polymer can be cured with sulphur to develop an elastic limit and a tensile strength ranging from about 1,000 to 4,500 pounds per square inch. When cured with sulphur, the material is substantially fully saturated chemically, and it appears that approximately 1½% to 3% of the sulphur based upon the weight of polymer used is sufficient for a satisfactory cure, and sufficient for a complete chemical saturation of the polymer substance. Further quantities of sulphur above this approximate amount are substantially without effect upon the polymer, except in so far as they behave like inert filler substances. The curing is preferably carried out in the presence of a suitable sulphurization aid such as the substance known as Tuads (tetra-methyl thiuram disulphide) or other analogous thiuram compounds or metallic salts of the alkyl dithiocarbamates.

The low unsaturation of the polymer material thus is in conspicuous contrast to the relatively high unsaturation of natural rubber, and the capability of the polymer of absorbing a small amount of sulphur to produce both a cure and a complete chemical saturation of the polymer substance is likewise in outstanding contrast to the characteristics of natural rubber. In the presence of excess quantities of sulphur rubber continues to absorb the sulphur chemically and approaches more and more nearly the condition of a resin in which state it is hard, brittle, nonplastic and inelastic. The present polymer material is non-reactive with excess quantities of sulphur thereby differing conspicuously from natural rubber, and, as above pointed out, excess quantities of sulphur produce little or no effect upon the physical properties of the polymer.

The cured polymer produced as above indicated shows in addition the further very valuable property of an outstandingly high resistance to oxidation. A convenient test for oxidation resistance is the Bierer-Davis bomb procedure. This test consists in heating a sample of the material in a slow current of substantially pure oxygen at a pressure of 300 pounds to the square inch and a temperature of 70° C. for approximately 14 days. This test applies powerful oxidizing conditions to the substances in the bomb. A high grade rubber compound of the type commonly used for air bags will lose approximately 90% of its tensile strength in the course of this treatment. The cured copolymer material of the present invention lost approximately 15% of its tensile strength during test treatment in the bomb, showing a very greatly superior oxidation resistance in comparison with the oxidation resistance of rubber.

A modified form of the Bierer-Davis bomb test was then applied to samples of rubber and the polymeric material of the present invention utilizing a slow current of substantially pure oxygen under a pressure of 300 pounds to the square inch and a temperature of 100° C. for 7 days. This much more severe form of test reduced the strength of a rubber sample to less than 5% of its original strength, but reduced the strength of the polymer material of the present invention by only 18% to 20% of its original strength, leaving present in the material 80% to 82% of the original strength as against 5% of the original strength for the rubber sample.

Furthermore, the cured polymer materials of the present invention are very much more stable chemically in the temperature range from 125° C. to 175° C. than is the case with rubber, and there is much less breakdown of the material, much less loss in tensile strength, much less loss in elasticity, and much greater durability than is the case with rubber.

Similarly, the polymer materials of the present invention are much more resistant to the effects of steam and hot water. Comparative tests of samples maintained in water at a temperature of 100° C. for a period of 7 days showed that the polymer increased in weight by absorption of water by 2.9%, whereas rubber increased in weight from absorption of water by approximately 12%.

Because of the outstandingly greater resistance of the polymer materials both to oxygen and to steam or hot water, they are much superior to the ordinary tire bags produced from rubber.

Because of these facts, tire bags produced from the polymer may be made with much thinner walls, and may be used for much longer periods of time, and may be used for the vulcanization of many more rubber tire carcasses than is possible with rubber tire bags, since the end of the life of a polymer tire bag occurs only because of mechanical injury to the tire bag, such as tearing or cutting, or from the unavoidable wear and abrasion in use. However, the polymer when cured with the normal amount of sulphur has both an abrasion resistance and a flexure resistance which are much greater than those of rubber and are, in fact, so great that the tire bag will outwear the reasonable average chance of destructive accident, and the life of a tire bag is usually not terminated by mere wear in use.

In preparing the tire bag as shown in Fig. 1, a suitable mixture or "compound" is prepared. This desirably consists of the polymeric material with suitable proportions of pigment, sulphur, sulphurization aid, etc. For this purpose the following "compounding" formula may be used:

|  | Parts |
|---|---|
| Copolymer { Isobutylene / Butadiene } | 100 |
| "Calcene" | 50 |
| Zinc oxide | 50 |
| Stearic acid | 3 |
| Tuads (tetra-methyl thiuram disulphide) | 1 |
| Sulphur | 3 |

("Calcene" is a stearic acid treated powdered calcium carbonate).

(In the above formula, a desirable polymer or interpolymer is that produced at a temperature of approximately −98° C. from a mixture of 80 parts isobutylene, 20 parts butadiene, 300 parts of liquid ethylene, and 5 to 7 parts of a catalyst solution sprayed upon the surface of the mixed olefins. The catalyst solution desirably contains approximately 1% of aluminum chloride and is preferably cooled to at least −78° C. before it is sprayed upon the mixed olefins.)

This mix is prepared in two steps, the first consisting of mixing the polymer, zinc oxide, stearic acid, and sulphur in a Banbury mixer or a similar internal mixer at a temperature of approximately 140° C. for about 10 minutes. This mix is then removed and placed upon an ordinary rubber mill which is cooled to a temperature of about 70° C. or lower, and the mix milled with the remainder of the compounding ingredients until it becomes a smooth continuous sheet.

Figure 2:
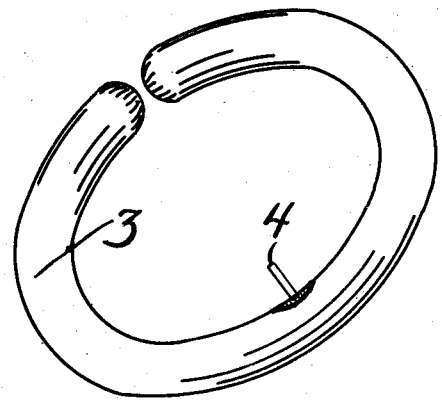
Fig. 2 is a view in perspective of an alternative form of a tire air bag according to the invention.

The "compound" is then formed into the desired tubular shape 3 as shown in the figures, preferably by an extruding operation through appropriate dies. Alternatively, it may be sheeted out on the mill, slit into strips, and the strips wound on a mandrel to give the desired form, size and thickness of tube for forming the air bag. The formed tubes are then cut to length and the ends joined as in Fig. 1, or closed over as in Fig. 2, according to the preferred type of usage.

When the structure is properly shaped, it is desirably cured by heating in a smooth metal mold, to a temperature ranging between about 150° C. and 200° C. for a time ranging from 15 minutes to 3 hours. The mold is then opened, the air bag removed, the air valve 4 inserted, and the air bag is ready for use.

The tire casing as prepared ready for vulcanizing is then assembled with the air bag, as above described, inside of the casing and the whole inserted within the mold. The air bag is then inflated to the desired pressure, usually from 20 to 150 pounds of air pressure, and the mold is heated to the vulcanization temperature of approximately 140° C. to 150° C. for the desired time, which may range from 15 minutes to 3 hours. At the close of the vulcanization, the mold is opened and the tire removed, and thereafter the air bag is stripped from the inside of the casing.

A tire air bag as so prepared is unexpectedly efficient for the curing of rubber tire carcasses. This appears to be due to the fact that the polymeric air bag material, being cured with sufficient sulphur to saturate it chemically, is inert toward the migratory sulphur from the tire carcass to the air bag, since the sulphur used in the original curing has fully saturated the polymer chemically. However, this phenomenon may be caused by other unknown factors and we do not wish to offer any exact explanation of its cause.

Furthermore, most of the substances (except the thiuram and thiocarbonate substances) which act as accelerators for the vulcanization of rubber are without appreciable effect upon the polymeric material and accordingly, any accelerator which may migrate from the tire carcass to the polymeric air bag along with the sulphur is likewise without effect, both because no more sulphur will combine with the polymeric material from the action of any accelerator and also because most of the accelerators are without effect upon the polymeric materials either alone or in the presence of sulphur.

Also, the sulphur in the original mixing formula is sufficient to saturate the polymeric material chemically, and any additional sulphur which may migrate or diffuse to the air bag from the tire carcass has little more effect than an inert filler pigment such as clay or zinc oxide upon the polymeric material air bag, and accordingly there is little tendency for the air bag to over-cure and become hard and brittle.

Because of these facts, the air bag of this invention may be made much thinner than is possible with a rubber air bag, and a polymeric material air bag only slightly thicker than an ordinary inner tube is sufficiently resistant to the influences of vulcanization to permit of the use of many more vulcanizations than is possible with any form of rubber air bag. This facilitates the removal of the air bag from the vulcanized tire.

Because of this resistance to sulphur, it is possible to control the extent of vulcanization of the inner surface of the tire casing by applying a thin layer of powdered sulphur to the inner surface of the casing to increase the sulphur content of the inner surface of the tire carcass by migration of the sulfur into it, or to reduce the sulphur content of the inner surface by applying a thin layer of rubber containing a very low sulphur content.

Figure 4:
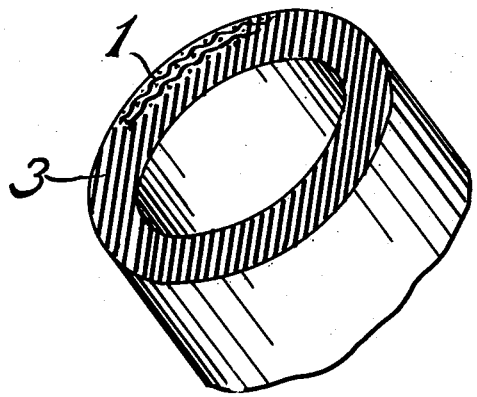
Fig. 4 is a view in cross section of an alternative form of the structure of the air bag of the invention.
Figure 3:
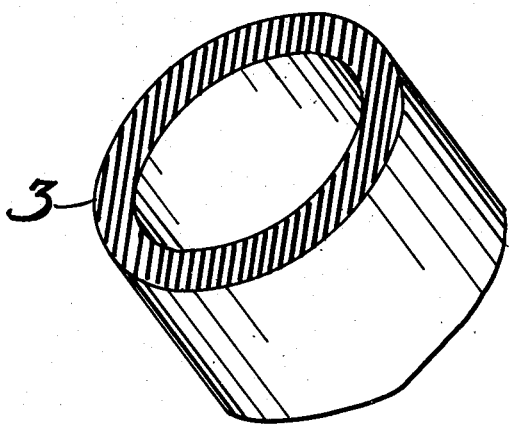
Fig. 3 is a cross section of the structure of the air bag of the invention.

Because of the high resistance of the polymer to the chemical influences of the vulcanization operation, the principal cause of wear upon the tire bag may in many instances be purely mechanical effects. A still stronger and more durable air bag may be produced by the incorporation into the air bag of a limited number of layers of fabric 1 as shown in Fig. 4, although this is not usually necessary. Nevertheless, the permissible thinness of the polymer layer to hold the air permits of the incorporation of fabric either in the form of square woven canvas type material or in the form of cords as used for tire carcass.

The above suggested mixing formula indicates as a preferred pigment, the substance known as "Calcene." This material is not, however, an essential substance, since it may be replaced by other fillers such as clays, various inorganic pigment substances such as ferric oxide, magnesium oxide, barytes, and many other inert inorganic pigments. Similarly, various organic fillers may be used in small proportion, including such substances as wood flour, ground cork, cellulosic materials generally, and similar substances.

Among the useful pigments for the mixing formula is carbon black in its various types. This filler is ordinarily used only where surface abrasion is to be encountered, and is therefore not usually necessary in a tire bag. Nevertheless, in instances where tire bags are subjected to severe service, it may be of value to incorporate into the mixture substantial amounts of carbon black.

The air bag of the present invention is particularly advantageous for the curing of rubber tires because of its high resistance to migrating sulphur from the tire carcass. It is, however, equally usable in the preparation of other types of tires from the various synthetic rubbers, whether sulphur is a constituent of the synthetic rubber or not, since if sulphur is a constituent, the tire bag of the present invention has the same advantage as with rubber; and in the case of those synthetic rubbers where sulphur is not used the high strength and high abrasion resistance of the polymer tire bag of the present invention makes it particularly valuable because of the long life under severe conditions of use and conditions which involve excessive wear upon the tire bag.

By the device of the invention there is thus provided a new type of air bag of greatly increased durability and utility, formed from a new and useful polymeric substance, and capable of use for the curing of a greatly increased number of tire casings.

While there are above disclosed but a limited number of the embodiments of this invention, it is possible to produce still other embodiments without departing from the inventive concepts herein disclosed, and it is therefore desired that only such limitations be imposed on the appended claims as are stated therein or required by the prior art.

The invention claimed is:

1. In a tire vulcanization system, including a metal tire mold, means for heating the tire mold and a source of gas under pressure for expanding a tire in said tire mold; an air bag connected to said source of gas, positioned within said tire, said air bag comprising a hollow, annular structure formed from an olefinic polymer of an iso-olefin and a diolefin, the said polymer being characterized by reactivity with sulphur to an extent sufficient to saturate the polymer chemically while leaving it in a strong, elastic condition, by inertness to larger amounts of sulphur, by a molecular weight within the range of 20,000 to 250,000, by an iodine number within the range of from 2 to 40, and by a high chemical resistance to steam, to sulphur and to vulcanization accelerators.

2. In a tire vulcanization system, including a metal tire mold, means for heating the tire mold and a source of gas under pressure for expanding a tire in said tire mold; an air bag connected to said source of gas, positioned within said tire, said air bag comprising a hollow, annular structure formed from an olefinic polymer of isobutylene and butadiene, the said polymer being characterized by reactivity with sulphur to an extent sufficient to saturate the polymer chemically while leaving it in a strong elastic condition, by an inertness to larger amounts of sulphur, by a molecular weight within the range of 20,000 to 250,000, by an iodine number within the range of from 2 to 40, and by a high chemical resistance to steam, to sulphur and to vulcanization accelerators.

3. In a tire curing system including a steel mold, means for heating the mold, and a source of air under pressure for expanding a tire in the mold, an air bag connected to said compressed air source, positioned within said tire, said air bag comprising an interpolymer of isobutylene and a diolefin, characterized by reactivity with approximately 3 parts of sulphur per 100 parts of polymer, and a non-reactivity with additional amounts of sulphur; a molecular weight within the range of 20,000 to 250,000, an iodine number within the range of 2 to 40, elasticity, a high tensile strength and high abrasion resistance.

4. In a tire curing system including a steel mold, means for heating the mold, and a source of air under pressure for expanding the tire in the mold, an air bag connected to said compressed air source, positioned within said tire, said air bag comprising an interpolymer of isobutylene and a diolefin, characterized by reactivity with approximately 3 parts of sulphur per 100 parts of polymer, and a non-reactivity with additional amounts of sulphur; a molecular weight within the range of 20,000 to 250,000, an iodine number within the range of 2 to 40, elasticity, a high tensile strength and high abrasion resistance, the said polymer substance being compounded with 3 parts of sulphur per 100 parts of polymer.

5. In a tire curing system including a steel mold, means for heating the mold, and a source of air under pressure for expanding the tire in the mold, an air bag connected to said compressed air source, positioned within said tire, said air bag comprising an interpolymer of isobutylene and a diolefin, characterized by reactivity with approximately 3 parts of sulphur per 100 parts of polymer, and a non-reactivity with additional amounts of sulphur; a molecular weight within the range of 20,000 to 250,000, an iodine number within the range of 2 to 40, elasticity, a high tensile strength and high abrasion resistance, the said polymer substance being compounded with 3 parts of sulphur per 100 parts of polymer and a sulphurization aid.

6. In a tire curing system including a steel mold, means for heating the mold, and a source of air under pressure for expanding the tire in the mold, an air bag connected to said compressed air source, positioned within said tire, said air bag comprising an interpolymer of isobutylene and a diolefin, characterized by reactivity with approximately 3 parts of sulphur per 100 parts of polymer, and a non-reactivity with additional amounts of sulphur; a molecular weight within the range of 20,000 to 250,000, an iodine number within the range of 2 to 40, elasticity, a high tensile strength and high abrasion resistance, the said polymer substance being compounded with 3 parts of sulphur per 100 parts of polymer, a sulphurization aid, zinc oxide and stearic acid.

7. In a tire curing system including a steel mold, means for heating the mold, and a source of air under pressure for expanding the tire in the mold, an air bag connected to said compressed air source, positioned within said tire, said air bag comprising an interpolymer of isobutylene and a diolefin, characterized by reactivity with approximately 3 parts of sulphur per 100 parts of polymer, and a non-reactivity with additional amounts of sulphur; a molecular weight within the range of 20,000 to 250,000, an iodine number within the range of 2 to 40, elasticity, a high tensile strength and high abrasion resistance, the said polymer substance being compounded with 3 parts of sulphur per 100 parts of polymer, a sulphurization aid, zinc oxide, stearic acid and carbon black.

8. A method of curing a large number of rubber tires comprising in combination the steps of inserting the soft tire carcasses successively in a steel mold with a synthetic polymer air bag within the carcass in succession, the air bag being characterized by resistance to migrating sulphur and migrating vulcanization accelerators whereby the chemical constitution and physical characteristics of the air bag remain substantially unchanged through the entire life of the air bag and produce no different effect upon the first carcass than upon the last carcass.

PER K. FROLICH.
HARRIS D. HINELINE.